(12) United States Patent
Ramamurthi et al.

(10) Patent No.: US 11,080,606 B2
(45) Date of Patent: Aug. 3, 2021

(54) PARALLELIZATION TECHNIQUES FOR VARIABLE SELECTION AND PREDICTIVE MODELS GENERATION AND ITS APPLICATIONS

(71) Applicant: Tata Consultancy Services Limited, Mumbai (IN)

(72) Inventors: Narayanan Ramamurthi, Hyderabad (IN); Geervani Koneti, Hyderabad (IN)

(73) Assignee: Tate Consultancy Services Limited, Mumbai (IN)

( * ) Notice: Subject to any disclaimer, the term of this patent is extended or adjusted under 35 U.S.C. 154(b) by 953 days.

(21) Appl. No.: 15/625,383

(22) Filed: Jun. 16, 2017

(65) Prior Publication Data
US 2017/0364809 A1 Dec. 21, 2017

(30) Foreign Application Priority Data
Jun. 17, 2016 (IN) .............................. 201621020879

(51) Int. Cl.
*G06N 5/02* (2006.01)
*G06F 17/18* (2006.01)
*G06N 3/12* (2006.01)

(52) U.S. Cl.
CPC .............. *G06N 5/022* (2013.01); *G06F 17/18* (2013.01); *G06N 3/126* (2013.01)

(58) Field of Classification Search
CPC ........ G06F 17/18; G06N 5/022; G06N 20/10; G06N 3/126
See application file for complete search history.

(56) References Cited

U.S. PATENT DOCUMENTS 8,706,670 B2 4/2014 Hsieh et al.
10,706,188 B1 * 7/2020 von Davier .............. G09B 7/02
(Continued)

FOREIGN PATENT DOCUMENTS

CN 103413052 11/2013

OTHER PUBLICATIONS

De Paula et al. on "A GPU-Based Implementation of the Firefly Algorithms for Variable Selection in Multivariate Calibration Problems" on PLoS ONE 9(12): e114145. Retrieved on [Jun. 25, 2020], Retrieved from the Internet <https://journals.plos.org/plosone/article?id=10.1371/journal.pone.0114145> (Year: 2014).*
(Continued)

*Primary Examiner* — Aimee Li
*Assistant Examiner* — Carlo Waje
(74) *Attorney, Agent, or Firm* — Finnegan, Henderson, Farabow, Garrett & Dunner LLP

(57) ABSTRACT

Predictive regression models are widely used in different domains such as life sciences, healthcare, pharma etc. and variable selection, is employed as one of the key steps. Variable selection can be performed using random or exhaustive search techniques. Unlike a random approach, the exhaustive search approach, evaluates each possible combination and consequently, is a computationally hard problem, thus limiting its applications. The embodiments of the present disclosure perform i) parallelization and optimization of critical time consuming steps of the technique, Variable Selection and Modeling based on the Prediction (VSMP) ii) its applications for the generation of the best possible predictive models using input dataset (e.g., Blood Brain Barrier Permeation data) and iii) business impact of predictive models that are requires the selection of larger number of variables.

9 Claims, 6 Drawing Sheets

(56) References Cited

U.S. PATENT DOCUMENTS

| | | | |
|---|---|---|---|
| 10,733,012 B2* | 8/2020 | Nugteren | G06F 8/451 |
| 2020/0250185 A1* | 8/2020 | Anderson | G06F 16/2358 |
| 2020/0257992 A1* | 8/2020 | Achin | G06N 5/04 |

OTHER PUBLICATIONS

Liu et al. on "VSMP: A Novel Variable Selection and Modeling Method Based on the Prediction" in J. Chem. Inf. Comput. Sci. 2003, 43, 3. Retrieved on [Jun. 25, 2020], Retrieved from the Internet <https://pubs.acs.org/doi/pdf/10.1021/ci020377j> (Year: 2003).*

Guillen et al. on "Evolutive Approaches for Variable Selection Using a Non-parametric Noise Estimator" on Parallel Architectures and Bioinspired Algorithms pp. 243-266. Retrieved on [Jun. 25, 2020], Retrieved from the Internet <https://link.springer.com/content/pdf/10.1007%2F978-3-642-28789-3_11.pdf> (Year: 2012).*

Chan et al. on "A Graphic Processing Unit (GPU) Algorithm for Improved Variable Selection in Multivariate Process Monitoring" on Computer Aided Chemical Engineering vol. 31. Retrieved on [Jun. 25, 2020], Retrieved from the Internet <https://www.sciencedirect.com/science/article/pii/B9780444595065501371> (Year: 2012).*

NVIDIA'S Next Generation CUDA™ Compute Architecture: Fermi. Retrieved on [Jun. 24, 2020], Retrieved from the Internet <https://www.nvidia.com/content/PDF/fermi_white_papers/NVIDIA_Fermi_Compute_Architecture_Whitepaper.pdf> (Year: 2009).*

CUDA Overview. Retrieved on [Jun. 24, 2020], Retrieved from the Internet <https://web.archive.org/web/20160715073736/http://cuda.ce.rit.edu/cuda_overview/cuda_overview.htm> (Year: 2016).*

CUDA C Programming Guide. Retrieved on [Jun. 30, 2020] Retrieved from the Internet <https://web.archive.org/web/20131226190048/http://docs.nvidia.com/cuda/pdf/CUDA_C_Programming_Guide.pdf> (Year: 2013).*

Oracle, "Using Barrier Synchronization Multithreaded Programming Guide" March (2016). Retrieved on [Nov. 23, 2020], Retrieved from the Internet <https://web.archive.org/web/20160305015357/https://docs.oracle.com/cd/E19120-01/open.solaris/816-5137/gfwek/index.html> (Year: 2016).*

Laura Cassia Marlins de Paula et al, (Feb. 2016). "Parallel: regressions for variable selection using GPU," *Computing*, 1 page.

* cited by examiner

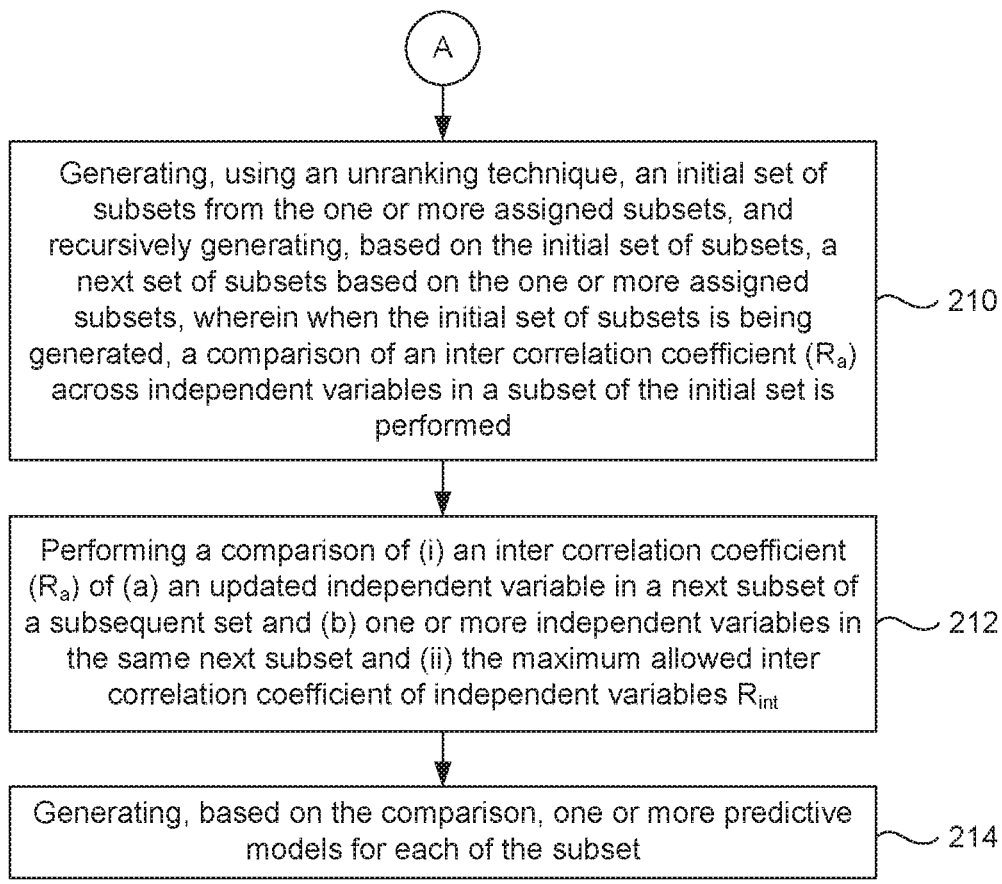
FIG. 2 (Contd)

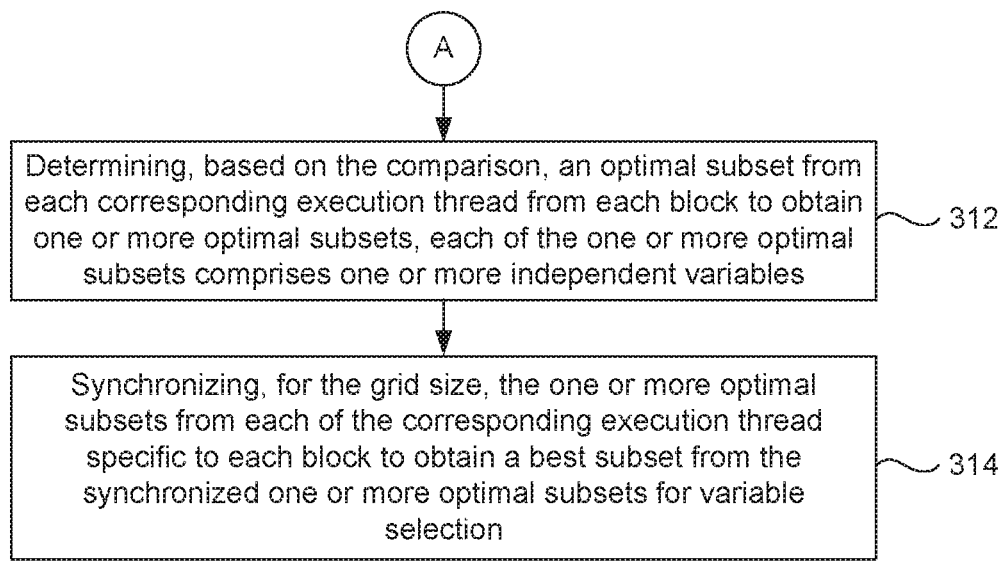
FIG. 3 (Contd)

PARALLELIZATION TECHNIQUES FOR VARIABLE SELECTION AND PREDICTIVE MODELS GENERATION AND ITS APPLICATIONS

PRIORITY CLAIM

This U.S. patent application claims priority under 35 U.S.C. § 119 to: India Application No. 201621020879, filed on Jun. 17, 2016. The entire contents of the aforementioned application are incorporated herein by reference.

TECHNICAL FIELD

The disclosure herein generally relate to search optimization techniques, and, more particularly, to parallelizing variables selection and modelling method based on prediction and its applications.

BACKGROUND

Advancements in various sciences such as physical, life, social sciences etc., have generated large amounts of data and there is great interest to make use of these data for the creation of new knowledge, as it is expected to improve the quality of human life. The quest for the new knowledge that includes insights, rules, alerts, predictive models etc. and its associated positive impact on humanity, have created an urgent need for the development of efficient data analytics techniques and technologies such as high performance computing, cloud computing etc., which can handle large amounts of data. Variable selection methods are one such data analytics approach that is applied to the selection of a subset of variables (X) from a large pool of variables based on various statistics measures. The selected variables can be used for the development of prediction models for a dependent variable (Y), when used with modelling techniques such as multiple linear regression, nonlinear regression, etc. The variables selection can be accomplished using a random or exhaustive search technique. The random approach, includes heuristic methods such as ant colony, particle swarm optimization, genetic algorithm, and the like; however, these methods cannot guarantee an optimal solution as they fail to explore the complete problem (variable) space. Unlike a random approach, the exhaustive search approach, evaluates each possible combination and thus provides the best solution; however, it is a computationally hard problem, thus limiting its applications to the selection of smaller subsets.

Predictive regression model generation, in principle involves the following three critical steps: a) data division, b) optimal features/variable selection from a large pool of structural features and c) model generation from the selected optimal features using regression techniques. Data quality and the efficiency of the above three steps determine robustness of the predictive models and their applications/business impact. For example, late stages failures of drug candidates can be addressed using reliable and easily applicable predictive ADMET models [Absorption, Distribution, Metabolism, Excretion and Toxicity]. As these computational models rationalize experimental observations, offer potential for virtual screening applications and consequently can help in reducing time and cost of the drug discovery and development process. The generation of predictive ADMET models based on structural features of drugs and drug candidates typically involves three critical steps, discussed earlier. The variable selection step enables researchers to a) derive rules/alerts that can be used for improving research outcomes b) provide the best sub-set of variables to generate robust predictive models that are applicable in virtual screening of drug candidates even before they are produced in laboratory. Thus, efficiency of the above steps have significant business impact across different domains.

SUMMARY

Embodiments of the present disclosure present technological improvements as solutions to one or more of the above-mentioned technical problems recognized by the inventors in conventional systems. For example, in one aspect, a processor implemented method for performing parallelization techniques for generating predictive models and variable selection and its applications is provided. The method comprising: defining, by one or more processors, (i) an input data comprising a set of independent variables, a set of dependent variables, and a subset size, (ii) a set of control parameters comprising maximum allowed inter correlation coefficient of independent variables $R_{int}$, and a minimum or maximum objective function threshold ($R_{cri}$) pertaining to the set of independent variables, and (iii) a block size and a grid size pertaining to a graphics processing unit (GPU), the block size and grid size are indicative of number of execution threads to be executed in one or more blocks in a grid; calculating, by the one or more processors, one or more inter correlation coefficients of each pair of independent variables from the set of independent variables; ranking, using a lexicographical technique, one or more subsets of independent variables from the set of independent variables; assigning the one or more ranked subsets to corresponding one or more execution threads of the GPU; executing, in parallel, in each of the one or more execution threads specific to the one or more blocks: generating, using an unranking technique, an initial set of subsets from the one or more assigned subsets, and recursively generating, based on the initial set of subsets, a next set of subsets based on the one or more assigned subsets, wherein when the initial set of subsets is being generated, a comparison of an inter correlation coefficient ($R_a$) across independent variables in a subset of the initial set is performed; performing a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$, wherein the updated independent variable in the next subset is obtained upon recursively generating one or more next subsets from the initial set of subsets; and generating, based on the comparison, one or more predictive models for each of the subset.

In an embodiment, when ($R_a$) is less than $R_{int}$, the one or more predictive models are generated for each of the subset. In an embodiment, the method may further comprise calculating model correlation coefficient $R_m$ based on the one or more generated predictive models and one or more dependent variables from the set of dependent variables.

In an embodiment, the method may further comprise performing a comparison of $R_m$ and ($R_{cri}$); and updating value of ($R_{cri}$) based on the comparison of $R_m$ and ($R_{cri}$).

In an embodiment, the method may further comprise determining, based on the comparison, an optimal subset from each corresponding execution thread from each block to obtain one or more optimal subsets, each of the one or more optimal subsets comprises one or more independent variables; and synchronizing, for the grid and block, the one or more optimal subsets from each of the corresponding execution threads specific to each block to obtain a best subset from the synchronized one or more optimal subsets for variable selection.

In another aspect, a system for performing parallelization techniques for generating predictive models and variable selection and its applications is provided. The system comprising: a memory storing instructions; one or more communication interfaces; and one or more hardware processors coupled to the memory via the one or more communication interfaces, wherein the one or more hardware processors are configured by the instructions to: define (i) an input data comprising a set of independent variables, a set of dependent variables, and a subset size, (ii) a set of control parameters comprising maximum allowed inter correlation coefficient of independent variables $R_{int}$, and a minimum or maximum objective function threshold ($R_{cri}$) pertaining to the set of independent variables, and (iii) a block size and a grid size pertaining to a graphics processing unit (GPU), the block size and grid size are indicative of number of execution threads to be executed in one or more blocks in a grid; calculate one or more inter correlation coefficients of each pair of independent variables from the set of independent variables; rank, using a lexicographical technique, one or more subsets of independent variables from the set of independent variables; assign the one or more ranked subsets to corresponding one or more execution threads of the GPU; execute, in parallel, in each of the one or more execution threads specific to the one or more blocks: generate, using an unranking technique, an initial set of subsets from the one or more assigned subsets, and recursively generating, based on the initial set of subsets, a next set of subsets based on the one or more assigned subsets, wherein when the initial set of subsets is being generated, a comparison of an inter correlation coefficient ($R_a$) across independent variables in a subset of the initial set is performed; perform a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$, wherein the updated independent variable in the next subset is obtained upon recursively generating one or more next subsets from the initial set of subsets; and generate, based on the comparison, one or more predictive models for each of the subset.

In an embodiment, when ($R_a$) is less than $R_{int}$, the one or more predictive models are generated for each of the subset. In an embodiment, the one or more hardware processors are may be further configured by instructions to calculate model correlation coefficient $R_m$ based on the one or more generated predictive models and one or more dependent variables from the set of dependent variables.

In an embodiment, the one or more hardware processors are may be further configured by instructions to perform a comparison of $R_m$ and ($R_{cri}$); and update value of ($R_{cri}$) based on the comparison of $R_m$ and ($R_{cri}$).

In an embodiment, the one or more hardware processors are may be further configured by instructions to determine, based on the comparison, an optimal subset from each corresponding execution thread from each block to obtain one or more optimal subsets, each of the one or more optimal subsets comprises one or more independent variables; and synchronize, for the grid and block, the one or more optimal subsets from each of the corresponding execution thread specific to each block to obtain a best subset from the synchronized one or more optimal subsets for variable selection.

In yet another aspect, one or more non-transitory machine readable information storage mediums comprising one or more instructions is provided. The one or more instructions which when executed by one or more hardware processors causes performing parallelization techniques for generating predictive models and variable selection and its applications by defining, by one or more processors, (i) an input data comprising a set of independent variables, a set of dependent variables, and a subset size, (ii) a set of control parameters comprising maximum allowed inter correlation coefficient of independent variables $R_{int}$, and a minimum or maximum objective function threshold ($R_{cri}$) pertaining to the set of independent variables, and (iii) a block size and a grid size pertaining to a graphics processing unit (GPU), the block size and grid size are indicative of number of execution threads to be executed in one or more blocks in a grid; calculating, by the one or more processors, one or more inter correlation coefficients of each pair of independent variables from the set of independent variables; ranking, using a lexicographical technique, one or more subsets of independent variables from the set of independent variables; assigning the one or more ranked subsets to corresponding one or more execution threads of the GPU; executing, in parallel, in each of the one or more execution threads specific to the one or more blocks: generating, using an unranking technique, an initial set of subsets from the one or more assigned subsets, and recursively generating, based on the initial set of subsets, a next set of subsets based on the one or more assigned subsets, wherein when the initial set of subsets is being generated, a comparison of an inter correlation coefficient ($R_a$) across independent variables in a subset of the initial set is performed; performing a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$, wherein the updated independent variable in the next subset is obtained upon recursively generating one or more next subsets from the initial set of subsets; and generating, based on the comparison, one or more predictive models for each of the subset.

In an embodiment, when ($R_a$) is less than $R_{int}$, the one or more predictive models are generated for each of the subset. In an embodiment, the one or more instructions which when executed by the one or more hardware processors further cause calculating model correlation coefficient $R_m$ based on the one or more generated predictive models and one or more dependent variables from the set of dependent variables.

In an embodiment, the one or more instructions which when executed by the one or more hardware processors further cause performing a comparison of $R_m$ and ($R_{cri}$); and updating value of ($R_{cri}$) based on the comparison of $R_m$ and ($R_{cri}$).

In an embodiment, the one or more instructions which when executed by the one or more hardware processors further cause determining, based on the comparison, an optimal subset from each corresponding execution thread from each block to obtain one or more optimal subsets, each of the one or more optimal subsets comprises one or more independent variables; and synchronizing, for the grid and block, the one or more optimal subsets from each of the corresponding execution thread specific to each block to obtain a best subset from the synchronized one or more optimal subsets for variable selection.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
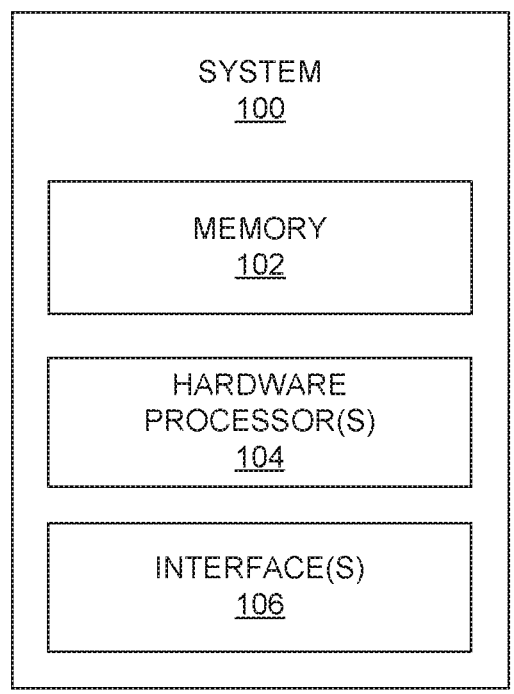
FIG. 1 illustrates an exemplary block diagram of a system for parallelization of variables selection and generating predictive models thereof for its applications in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for parallelization of variables selection and generating predictive models thereof for its applications in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. In an embodiment, the one or more devices are Long Term Evolution (LTE) devices (e.g., cellular devices). The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102. The memory 102 may further store information pertaining to communication between devices, and a base station (not shown in FIG. 1).

Figure 2:
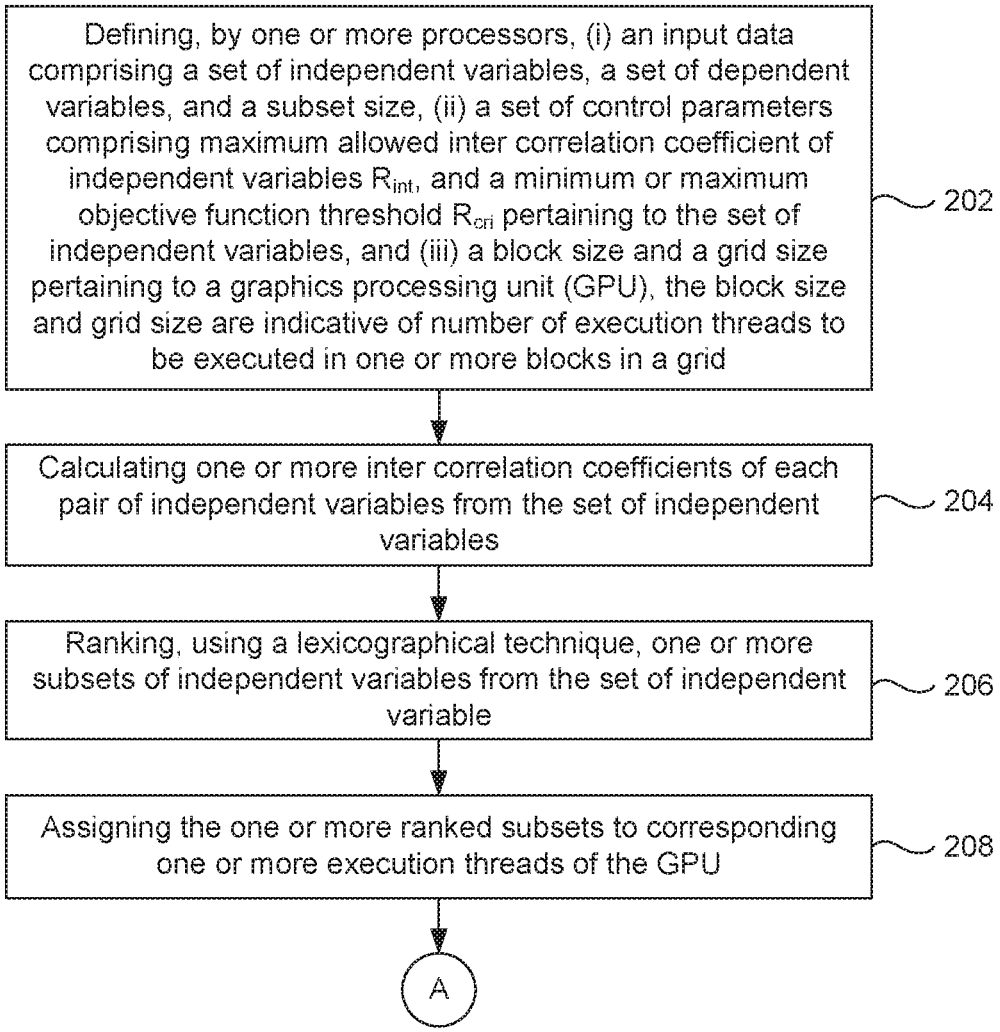
FIG. 2 illustrates an exemplary flow diagram of a method for parallelization of variables selection and generating predictive models thereof for its applications in accordance with an embodiment of the present disclosure.

FIG. 2, with reference to FIG. 1, illustrates an exemplary flow diagram of a method for parallelization of variables selection and generating predictive models thereof for its applications in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more hardware processors 104 define (i) an input data comprising a set of independent variables, a set of dependent variables, and a subset size, (ii) a set of control parameters comprising maximum allowed inter correlation coefficient of independent variables Rint, and a minimum or maximum objective function threshold (Rcri) pertaining to the set of independent variables, and (iii) a block size and a grid size pertaining to a graphics processing unit (GPU), the block size and grid size are indicative of number of execution threads to be executed in one or more blocks in a grid.

In an embodiment of the present disclosure, at step 204, the one or more hardware processors 104 calculate one or more inter correlation coefficients of each pair of independent variables from the set of independent variables.

In an embodiment of the present disclosure, at step 206, the one or more hardware processors 104 rank, using a lexicographical technique, one or more subsets of independent variables from the set of independent variables. In an embodiment of the present disclosure, at step 208, the one or more hardware processors 104 assign the one or more ranked subsets to corresponding one or more execution threads of the GPU.

In an embodiment of the present disclosure, steps 210, 212, and 214 are executed in parallel in each of the one or more execution threads specific to the one or more blocks. For example, at step 210, the one or more processors generate, using an unranking technique, an initial set of subsets from the one or more assigned subsets, and recursively generating, based on the initial set of subsets, a next set of subsets based on the one or more assigned subsets, wherein when the initial set of subsets is being generated, a comparison of an inter correlation coefficient ($R_a$) across independent variables in a subset of the initial set is performed.

In an embodiment of the present disclosure, at step 212, the one or more hardware processors 104 perform a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$. In an embodiment of the present disclosure, the updated independent variable in the next subset is obtained upon recursively generating one or more next subsets from the initial set of subsets. In an embodiment of the present disclosure, at step 214, the one or more hardware processors 104 generate one or more predictive models for each of the subset based on the comparison. In an embodiment of the present disclosure, when $R_a$ is less than $R_{int}$, the one or more predictive models are generated for each of the subset. In an embodiment of the present disclosure, based on the one or more generated predictive models, the one or more hardware processors 104 are further configured by the instructions to calculate model correlation coefficient $R_m$ based on the one or more generated predictive models and one or more dependent variables from the set of dependent variables. In an embodiment of the present disclosure, the model correlation coefficient $R_m$ comprise standard error, mean square error, variance, and the like. The one or more hardware processors 104 further perform a comparison of the model correlation coefficient $R_m$ and the objective function ($R_{cri}$). Based on the comparison between $R_m$ and $R_{cri}$, the value of $R_{cri}$ is updated. In an example embodiment, the value of $R_{cri}$ is updated when $R_m$ is greater than $R_{cri}$.

In an embodiment of the present disclosure, the one or more hardware processors are further configured by the instructions to: determine, based on the comparison, an optimal subset from each corresponding execution thread to obtain one or more optimal subsets wherein each of the one or more optimal subsets comprises one or more independent variables, and synchronize, for the grid size, the one or more optimal subsets from each of the corresponding execution thread specific to each block to obtain a best subset from the synchronized one or more optimal subsets for variable selection.

Figure 3:
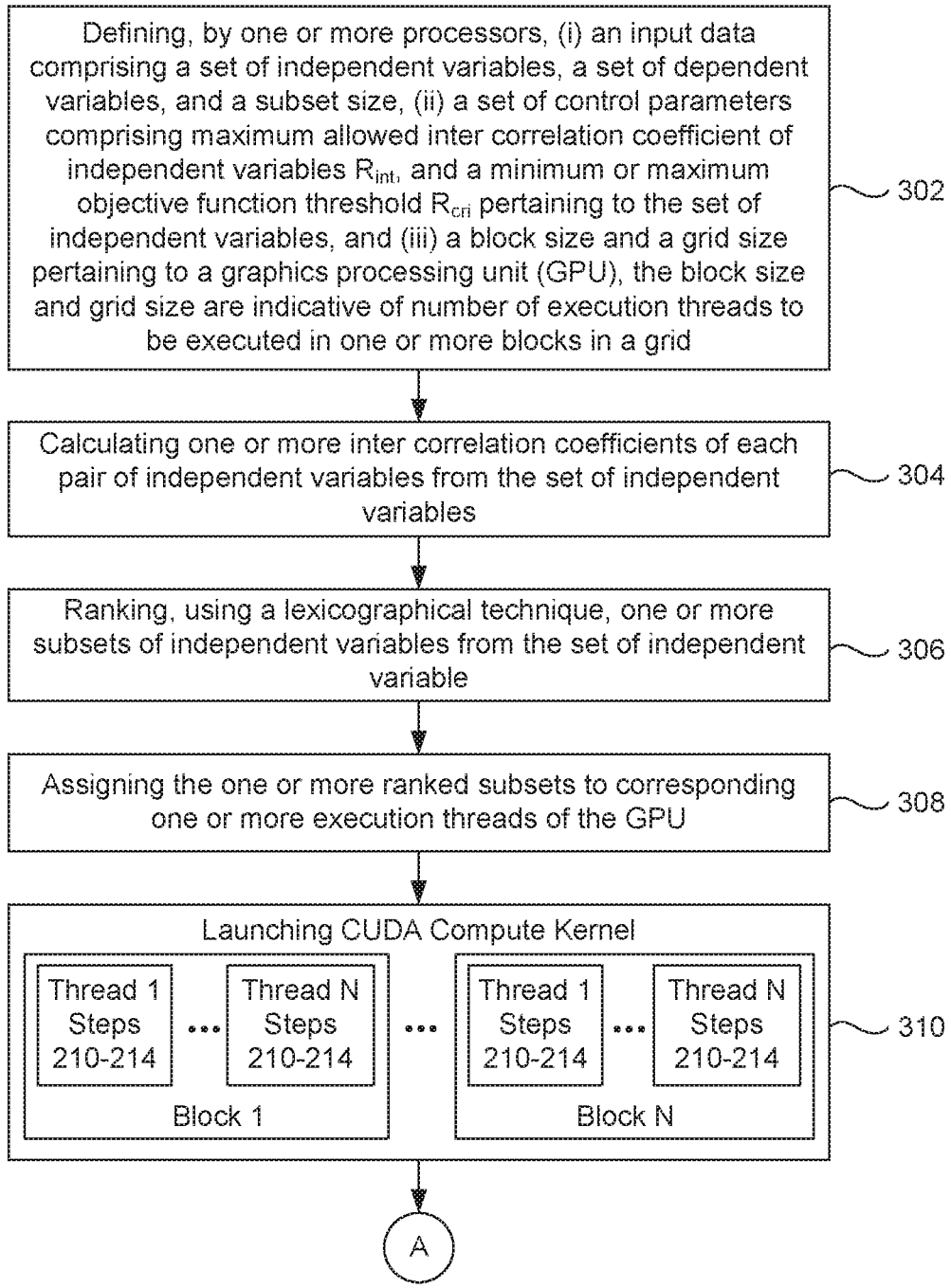
FIG. 3 is an exemplary flow diagram illustrating CUDA kernels workflow implemented by the system of FIG. 1 for parallelization of variables selection and generating predictive models thereof and its applications in accordance to an embodiment of the present disclosure.

FIG. 3, with reference to FIGS. 1-2, is an exemplary flow diagram illustrating CUDA Kernels workflow implemented by the system 100 of FIG. 1 for parallelization of variables selection and generating predictive models thereof and its applications in accordance to an embodiment of the present disclosure. The steps of the method of FIG. 3 will now be explained with reference to the components of the system 100 and the flow diagram as depicted in FIGS. 1-2. In an embodiment of the present disclosure, at step 302, the one or more hardware processors 104 define (i) an input data comprising a set of independent variables, a set of dependent variables, and a subset size, (ii) a set of control parameters comprising maximum allowed inter correlation coefficient of independent variables Rint, and an objective function (Rcri) pertaining to the set of independent variables, and (iii) a block size and a grid size pertaining to a graphics processing unit (GPU), the block size and grid size are indicative of number of execution threads to be executed in one or more blocks in a grid.

In an embodiment of the present disclosure, at step 304, the one or more hardware processors 104 calculate one or more inter correlation coefficients of each pair of independent variables from the set of independent variables. In an embodiment of the present disclosure, at step 306, the one or more hardware processors 104 rank, using a lexicographical technique, one or more subsets of independent variables from the set of independent variables. In an embodiment of the present disclosure, at step 308, the one or more hardware processors 104 assign the one or more ranked subsets to corresponding one or more execution threads of the GPU. At step 310, CUDA Kernel is launched, wherein the steps 210-214 of the flow diagram of FIG. 2 are executed in parallel for one or more threads pertaining to one or more blocks. Upon executing the steps 210-214, at step 312, the one or more hardware processors 104 determine, based on the comparison, an optimal subset from each corresponding execution thread to obtain one or more optimal subsets wherein each of the one or more optimal subsets comprises one or more independent variables. At step 314, the one or more hardware processors 104 synchronize, for the grid size, the one or more optimal subsets from each of the corresponding execution thread specific to each block to obtain a best subset from the synchronized one or more optimal subsets for variable selection. In an embodiment of the present disclosure, steps 312, and 314 are executed in parallel in each of the one or more execution threads specific to the one or more blocks depicted in step 310.

Figure 4:
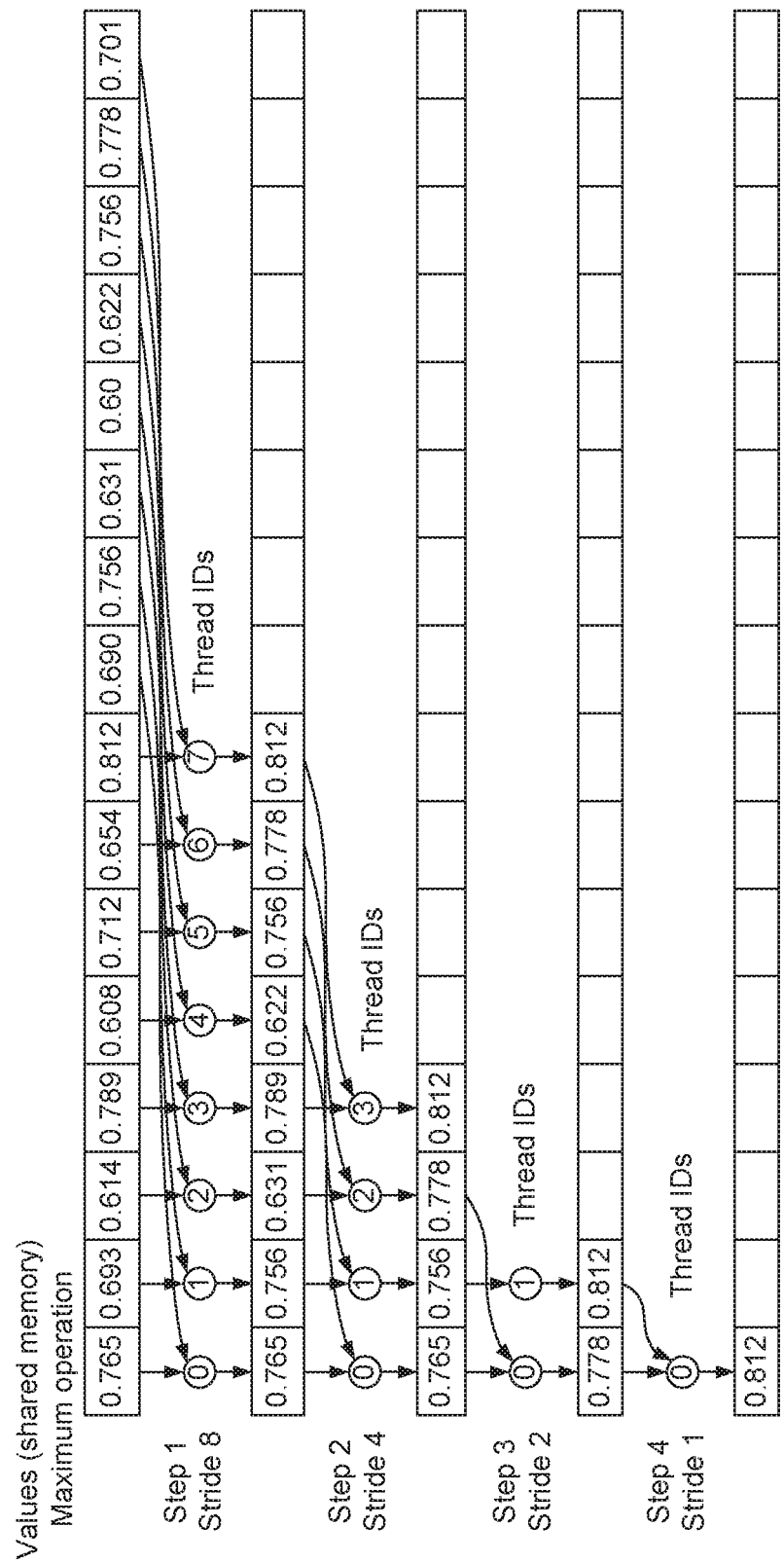
FIG. 4 illustrates an exemplary CUDA global reduction kernel according to an embodiment of the present disclosure.

FIG. 4, with reference to FIGS. 1 through 3, illustrates an exemplary CUDA global reduction Kernel according to an embodiment of the present disclosure. More particularly, FIG. 4 depicts thread identifiers (IDs), shared memory values during CUDA global reduction kernel execution.

Below are implementation details of the embodiments of the present disclosure by way of example:

The parallelization of variable selection and modeling method based on prediction (VSMP) on graphical processing unit (GPU) is performed using Compute Unified Device Architecture (CUDA) programming language. In this, the host, CPU, calls a CUDA kernel, a function that is executed on the GPU device. This kernel function is executed on one or more GPU threads that perform same operations on different input data. The total number of GPU threads depends upon the number of blocks (grid) and threads per block, which are launched by the host function. Each thread is identified by its block ID and thread ID (BLOCK_ID, THREAD_ID). Before launching the CUDA VSMP compute kernel the total combinations of subsets of independent variables to be evaluated are assigned among the GPU threads evenly using below expression illustrated by way of example:

$$\text{combinations\_per\_thread} = \frac{\text{total\_combinations}}{\text{GPU\_BLOCK\_SIZE} \times \text{GPU\_GRID\_SIZE}}$$

Where, total_combinations=$\binom{n}{r}$, r is the desired subset size. The GPU device can be a Tesla K20 NVIDIA GPU hosted on a 24 Core 1200 MHz Server.

Before porting the compute and memory intensive steps on to the GPU the following modifications are performed to achieve desired parallelism in the algorithm:

1. In CUDA programming model the memory latency of local memory is faster than the shared memory, which in turn is faster than global memory. Since the dynamic memory allocations on GPU are done on global memory rather the local memory, feasible array and matrix declarations were made static to reduce the memory latency.

2. The dependent variables are transferred to the device shared memory, as each thread accesses this memory for evaluating one or more built predictive models. In addition the block and grid level optimal subset values are also stored in the shared memory to facilitate the application of parallel reduction to find the best subset among the launched GPU threads.

3. The doubles (double precision) were converted to floats or integers (single precision) to reduce the time taken to compute the arithmetic operations.

4. In CUDA, each thread is divided in to a group of 32 threads called as warps. The threads in each warp run, in parallel, synchronously for each step of the code. Thus, a code having (many) 'if and else' or 'for' loops creates divergence in the paths of the threads of a particular warp, which are then executed sequentially, resulting in performance bottle necks. As observed, the leave one out cross validation performed after each model generation is time consuming, and also accounts for thread divergence but has little or no effect on the best subset the method finds. Thus, the leave one out validation is eliminated from the algorithm.

5. The subsets to evaluate are arranged lexicographically and assigned to each thread depending on the rank of the subset and index of the thread. Below are illustrative subsets depicted by way of examples. Using blood brain barrier (BBB) data of 88 (m, number of observations) drugs and drug-like compounds and 277 descriptors/independent variables derived from chemical structures of the observations employed. The terms "descriptors" and "variables" are synonymous and can be used interchangeably. For example, in the case of selection of for combinations of 4 subset of 277 variables, with grid size 4096 and block size 512, below table 1 depicts details of subsets, rank, and assigned kernels:

TABLE 1

| Subset | Rank | Assigned Kernel (Block ID, Thread ID) |
|---|---|---|
| 1, 2, 3, 4 | 0 | (0, 0) |
| 1, 2, 3, 5 | 1 | |
| 1, 2, 3, 6 | 2 | |
| ... | ... | |
| ... | ... | |
| 1, 2, 3, 119 | 115 | (0, 1) |
| ... | ... | |
| 274, 275, 276, 277 | 240027424 | (4095, 511) |

Further, in the current case study a Multiple Linear Regression model was implemented, for predicting the dependent variable, as per below expression depicted by way of example:

$$\hat{y} = X\hat{\beta} = X(X'X)^{-1}X'y \quad (1)$$

wherein X is a given dataset comprising (n compounds, m descriptors/independent variables) and y (n compound's dependent variable).

The compute intensive steps as noticed in the above equation are the matrix multiplications and inverse operations. In an embodiment of the present disclosure, different approaches (or techniques) for calculating the matrix inverse may be utilized, for example, using determinants and co-factors, Gauss Jordan Row Elimination, and Strassen Technique, while the approaches determinants and co-factors, and Strassen are recursive methods which are not suitable for the GPU CUDA architecture, returning an address out of bounds error. Thus, a matrix inverse is computed using Gauss Jordan Row elimination, whose compute complexity is $O(n^3)$.

Further, the following optimizations are implemented to improve the performance of the code:

1. While evaluating the set of next subsets or combinations recursively the inter-correlation of the independent variables or descriptors is checked only for the updated subset values rather than the whole combination. This reduces the comparison and memory read operations from $(r-1)!$ to $(r-1)$, where r is the subset size. For example, if a current subset is (5, 11, 19, 47) and the next subset to be evaluated is (5, 11, 19, 48), the inter correlation of 48 is checked against 5, 11, 19 to verify if it's below $R_{int}$ (ex: 0.75) rather than checking 5 against 11, 19, 48; 11 against 19, 48; and 19 against 48.

2. Also, the subset matrix needed for building (or generating) predictive model(s) has been updated only with the values of updated descriptor (48th descriptor in above example). This optimization reduces the memory read and writes from (r*m) to m operations, where m is the number of compounds.

3. Temporary redundant variables were eliminated and the for loops were unrolled to compact the arithmetic operations as illustrated in the below example

```
for ( j = 0;j < r; j + +){
    param[k] = param[k] + inverse[j] * xy[j]
}
``` is re-written as:

param[*k*]=inverse[0]*xy[0]+inverse[1]*xy[1]+inverse[2]* xy[2]

4. Data dependent operations were reduced, such as instructions that use the value computed in previous operation, either by reordering the operations, interchanging the loops or by using temporary variables. Although by default CUDA architecture handles such operations internally by executing other independent operations, it is observed that by using such temporary variables (two, four or eight) the performance of the method can be slightly improved. Below is a sample illustration of some of the approaches described in this point:

```
for ( j = 0;j < r; j + +){
    param[k] = param[k] + inverse[j] * xy[j]
}
``` can be re-written as:

```
for ( j = 0;j < r; j+= 2){
    temp1 = temp1 + inverse[j] * xy[j]
    temp2 = temp2 + inverse[j + 1] * xy[j + 1]
}
    param[k] = temp1 + temp2
``` or,

```
for ( j = 0;j < r/2; j + +){
    temp1 = temp1 + inverse[j] * xy[j]
    temp2 = temp2 + inverse[j + r/2] * xy[j + r/2]
}
    param[k] = temp1 + temp2
```

Below is an illustrative Table 2 that depicts optimization, time in seconds, and speed up. The control parameters used for the below results are maximum inter-correlation coefficient ($R_{int}$) 0.75; objective function, multiple linear regression correlation coefficient, threshold ($R_{cri}$) 0.65; subset size 4; number of independent variables 277; number of observation, m, 88; number of blocks 512, number of grids 4096.

|  | Subset Size | Serial Time (sec) | Serial MLR Correlation Coefficient and Subset of Variables Selected | CUDA GPU Time (sec) | CUDA GPU MLR Correlation Coefficient and Subset of Variables Selected | Achieved Performance Efficiency |
|---|---|---|---|---|---|---|
|  | 4 | 2415 | r = 0.8638; kappa shape index of order, atomic type E-state index (SsssN), atomic level based Al topological descriptor (AlssssC), AlogP98 | 51 | r = 0.8638; kappa shape index of order, atomic type E-state index (SsssN), atomic level based Al topological descriptor (AlssssC), AlogP98 | ~47 X |
|  | 5 | ~131850 (Estimated) | r = 0.8735; kappa shape index of order, atomic type E-state index (SsssN), atomic level based Al topological descriptor (AlssssC), AlogP98, AlsBr | 3420 | r = 0.8735; kappa shape index of order, atomic type E-state index (SsssN), atomic level based Al topological descriptor (AlssssC), AlogP98, AlsBr | 38 X (Estimated) |

TABLE 2

| Method Version/ Modification | Time (sec) | Speed up | MLR Correlation Coefficient and Subset |
|---|---|---|---|
| Java Serial Code | 2415 |  | r = 0.8638; kappa shape index of order, atomic type E-state index (SsssN), atomic level based Al topological descriptor (AlssssC), AlogP98 |
| Using Gauss Jordan row elimination, removing leave one out cross validation and using double precision | 124 | ~19X | r = 0.8638; kappa shape index of order, atomic type E-state index (SsssN), atomic level based Al topological descriptor (AlssssC), AlogP98 |
| After unrolling for loops, removing redundant computations and using single precision (Step: 0041.3) | 62 | ~38X | r = 0.8638; kappa shape index of order, atomic type E-state index (SsssN), atomic level based Al topological descriptor (AlssssC), AlogP98 |
| After minimizing data dependent operations (Step: 0041.4) | 51 | ~47X | r = 0.8638; kappa shape index of order, atomic type E-state index (SsssN), atomic level based Al topological descriptor (AlssssC), AlogP98 |

Below is an illustrative Table 3 that depicts the performance improvement achieved using CUDA programming; it is of significance to note that higher number of variables can be selected by scaling the methodology of the present disclosure to additional GPU devices. This has detrimental business effect particularly in the scenarios of building robust models using more number of variables, for example, in the current disclosure this has been validated using the development of predictive models for blood brain barrier penetration and is expected to reduce cost of preparing compounds.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure provide systems and methods for parallelization techniques for generating predictive models and variable selection and its applications. The parallelization techniques for generating predictive models and variable selection and its applications is achieved by assigning each combination to the individual kernels of GPU based on thread's index and lexicographical rank of subset. The initial subset is derived using unranking technique and then iterating over it to evaluate other combinations. This enables parallelism of the proposed method and assigns combinations uniquely to each kernel.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (200), comprising:
    defining (202), by one or more processors, (i) an input data comprising a set of independent variables, a set of dependent variables, and a subset size, (ii) a set of control parameters comprising maximum allowed inter correlation coefficient of independent variables $R_{int}$, and a minimum or maximum objective function threshold ($R_{cri}$) pertaining to the set of independent variables, and (iii) a block size and a grid size pertaining to a graphics processing unit (GPU), the block size and grid size are indicative of number of execution threads to be executed in one or more blocks in a grid;
    ranking (206), using a lexicographical technique, one or more subsets of independent variables from the set of independent variables;
    assigning (208) the one or more subsets ranked to corresponding one or more execution threads of the GPU;
    executing, in parallel, in each of the one or more execution threads specific to the one or more blocks in the grid:
        generating (210), using an unranking technique, an initial set of subsets from the one or more subsets assigned, and recursively generating, based on the initial set of subsets, a next set of subsets based on the one or more subsets assigned, wherein when the initial set of subsets is being generated, a comparison of an inter correlation coefficient ($R_a$) across independent variables in a subset of the initial set is performed;
        performing (212) a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$, reduces the comparison and memory read operation, wherein the updated independent variable in the next subset is obtained upon recursively generating one or more next subsets from the initial set of subsets;
        determining, based on the comparison, an optimal subset from each corresponding execution thread from each block to obtain one or more optimal subsets, each of the one or more optimal subsets comprises one or more independent variables; and
        synchronizing, for the grid and the block, the one or more optimal subsets from each of the corresponding execution thread specific to each block to obtain a best subset from the synchronized one or more optimal subsets for variable selection, wherein values of the one or more optimal subsets are stored in a shared memory;
    generating (214), based on the comparison, one or more predictive models for the best subset; and
    calculating model correlation coefficient $R_m$ based on the one or more generated predictive models and one or more dependent variables from the set of dependent variables, wherein the one or more dependent variables are stored in the shared memory, wherein the model correlation coefficient $R_m$ comprise standard error, mean square error and variance, and wherein the processor implemented method eliminates Leave One Out (LOO) cross-validation performed after the one or more predictive models generated for obtaining the best subset.

2. The processor implemented method of claim 1, wherein when $R_a$ is less than $R_{int}$, the one or more predictive models are generated for each of the subset.

3. The processor implemented method of claim 1, further comprising:
    performing a comparison of $R_m$ and $R_{cri}$; and
    updating value of $R_{cri}$ based on the comparison of $R_m$ and $R_{cri}$.

4. A system (100) comprising:
    a memory (102) storing instructions;
    one or more communication interfaces (106); and
    one or more hardware processors (104) coupled to the memory (102) via the one or more communication interfaces (106), wherein the one or more hardware processors (104) are configured by the instructions to:

define (i) an input data comprising a set of independent variables, a set of dependent variables, and a subset size, (ii) a set of control parameters comprising maximum allowed inter correlation coefficient of independent variables $R_{int}$, and a minimum or maximum objective function threshold ($R_{cri}$) pertaining to the set of independent variables, and (iii) a block size and a grid size pertaining to a graphics processing unit (GPU), the block size and grid size are indicative of number of execution threads to be executed in one or more blocks in a grid;

rank, using a lexicographical technique, one or more subsets of independent variables from the set of independent variables;

assign the one or more subsets ranked to corresponding one or more execution threads of the GPU;

execute, in parallel, in each of the one or more execution threads specific to the one or more blocks in the grid:

generate, using an unranking technique, an initial set of subsets from the one or more subsets assigned, and recursively generating, based on the initial set of subsets, a next set of subsets based on the one or more subsets assigned, wherein when the initial set of subsets is being generated, a comparison of an inter correlation coefficient ($R_a$) across independent variables in a subset of the initial set is performed;

perform a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$, reduces the comparison and memory read operation, wherein the updated independent variable in the next subset is obtained upon recursively generating one or more next subsets from the initial set of subsets;

determine, based on the comparison, an optimal subset from each corresponding execution thread from each block to obtain one or more optimal subsets, each of the one or more optimal subsets comprises one or more independent variables, and synchronize, for the grid and the block, the one or more optimal subsets from each of the corresponding execution thread specific to each block to obtain a best subset from the synchronized one or more optimal subsets for variable selection, wherein values of the one or more optimal subsets are stored in a shared memory;

generate, based on the comparison, one or more predictive models for the best subset; and calculate model correlation coefficient $R_m$ based on the one or more generated predictive models and one or more dependent variables from the set of dependent variables, wherein the one or more dependent variables are stored in the shared memory, wherein the model correlation coefficient $R_m$ comprise standard error, mean square error and variance, and wherein the processor implemented method eliminates Leave One Out (LOO) cross-validation performed after the one or more predictive models generated for obtaining the best subset.

5. The system of claim 4, wherein when $R_a$ is less than $R_{int}$, the one or more predictive models are generated for each of the subset.

6. The system of claim 4, wherein the one or more hardware processors (104) are further configured by the instructions to:

perform a comparison of $R_m$ and $R_{cri}$, and update value of $R_{cri}$ based on the comparison of $R_m$ and $R_{cri}$.

7. One or more non-transitory machine readable information storage mediums comprising one or more instructions which when executed by one or more hardware processors causes:

defining, by the one or more hardware processors, (i) an input data comprising a set of independent variables, a set of dependent variables, and a subset size, (ii) a set of control parameters comprising maximum allowed inter correlation coefficient of independent variables $R_{int}$, and a minimum or maximum objective function threshold ($R_{cri}$) pertaining to the set of independent variables, and (iii) a block size and a grid size pertaining to a graphics processing unit (GPU), the block size and grid size are indicative of number of execution threads to be executed in one or more blocks in a grid;

ranking, using a lexicographical technique, one or more subsets of independent variables from the set of independent variables;

assigning the one or more subsets ranked to corresponding one or more execution threads of the GPU;

executing, in parallel, in each of the one or more execution threads specific to the one or more blocks in the grid:

generating, using an unranking technique, an initial set of subsets from the one or more subsets assigned, and recursively generating, based on the initial set of subsets, a next set of subsets based on the one or more subsets assigned, wherein when the initial set of subsets is being generated, a comparison of an inter correlation coefficient ($R_a$) across independent variables in a subset of the initial set is performed;

performing a comparison of (i) an inter correlation coefficient ($R_a$) of (a) an updated independent variable in a next subset of a subsequent set and (b) one or more independent variables in the same next subset and (ii) the maximum allowed inter correlation coefficient of independent variables $R_{int}$, reduces the comparison and memory read operation, wherein the updated independent variable in the next subset is obtained upon recursively generating one or more next subsets from the initial set of subsets;

determining, based on the comparison, an optimal subset from each corresponding execution thread from each block to obtain one or more optimal subsets, each of the one or more optimal subsets comprises one or more independent variables; and synchronizing, for the grid and the block, the one or more optimal subsets from each of the corresponding execution thread specific to each block to obtain a best subset from the synchronized one or more optimal subsets for variable selection, wherein values of the one or more optimal subsets are stored in a shared memory;

generating, based on the comparison, one or more predictive models for the best subset; and calculating model correlation coefficient $R_m$ based on the one or more generated predictive models and one or more dependent variables from the set of dependent variables, wherein the one or more dependent variables are stored in the shared memory, wherein the model correlation coefficient $R_m$ comprise standard error, mean square error and variance, and wherein the processor implemented method eliminates Leave One Out (LOO) cross-validation performed after the one or more predictive models generated for obtaining the best subset.

8. The one or more non-transitory machine readable information storage mediums of claim 7, wherein when $R_a$ is less than $R_{int}$, the one or more predictive models are generated for each of the subset.

9. The one or more non-transitory machine readable information storage mediums of claim 7, wherein the one or more instructions which when executed by the one or more hardware processors further cause:
  performing a comparison of $R_m$ and $R_{cri}$; and
  updating value of $R_{cri}$ based on the comparison of $R_m$ and $R_{cri}$.

\* \* \* \* \*